(12) United States Patent
Kim et al.

(10) Patent No.: US 8,773,597 B2
(45) Date of Patent: Jul. 8, 2014

(54) PIXEL-TO-BARRIER-UNEVENESS-CONTROLLABLE INK

(75) Inventors: Joon Hyung Kim, Daejeon (KR); Hyun Sik Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 17 days.

(21) Appl. No.: 13/244,041

(22) Filed: Sep. 23, 2011

(65) Prior Publication Data

US 2012/0015158 A1     Jan. 19, 2012

Related U.S. Application Data

(62) Division of application No. 11/375,534, filed on Mar. 15, 2006, now Pat. No. 8,053,493.

(30) Foreign Application Priority Data

Mar. 16, 2005     (KR) .............................. 2005-0021850

(51) Int. Cl.

| | | |
|---|---|---|
| *B32B 27/00* | (2006.01) |
| *G02B 5/30* | (2006.01) |
| *G02B 27/28* | (2006.01) |
| *G03B 21/14* | (2006.01) |
| *G03B 21/28* | (2006.01) |
| *G03F 1/00* | (2012.01) |
| *H01L 29/18* | (2006.01) |
| *H04N 3/14* | (2006.01) |
| *H04N 5/64* | (2006.01) |
| *H04N 5/66* | (2006.01) |
| *H04N 5/70* | (2006.01) |
| *H04N 9/12* | (2006.01) |
| *H04N 9/30* | (2006.01) |
| *H04N 9/31* | (2006.01) |

(52) U.S. Cl.
USPC ............................................ 348/739; 257/88

(58) Field of Classification Search
USPC .......... 428/500; 430/7, 46.3; 257/88; 353/84, 353/77, 79; 359/491.01; 348/800, 739, 744, 348/790, 791, 801, 802
See application file for complete search history.

(56) References Cited

U.S. PATENT DOCUMENTS

| | | | | |
|---|---|---|---|---|
| 6,114,404 A | * | 9/2000 | Deeken et al. | ................... 522/88 |
| 2004/0110862 A1 | * | 6/2004 | Hayashi | ........................ 522/184 |

* cited by examiner

*Primary Examiner* — Patrick Niland

(74) *Attorney, Agent, or Firm* — McKenna Long & Aldridge LLP

(57) ABSTRACT

Disclosed is an ink, which has a viscosity and a volumetric shrinkage, controlled to 20~80 cP and 10~30%, respectively, by controlling an amount of each of: (a) a first monomer having a viscosity of 7~1,600 cP and having one or two polymerizable functional groups; and (b) a second monomer having a viscosity of 30~20,000 cP and having at least three polymerizable functional groups, in the presence of 0~20 wt % of a solvent, and which can form a convex portion due to its surface tension controlled to 20~40 mN/m, so as to compensate for its volumetric shrinkage, wherein the viscosity and the surface tension are measured at 25° C. A substrate, which is patterned or information-recorded with the ink, and a display device having the substrate are also disclosed.

3 Claims, 1 Drawing Sheet

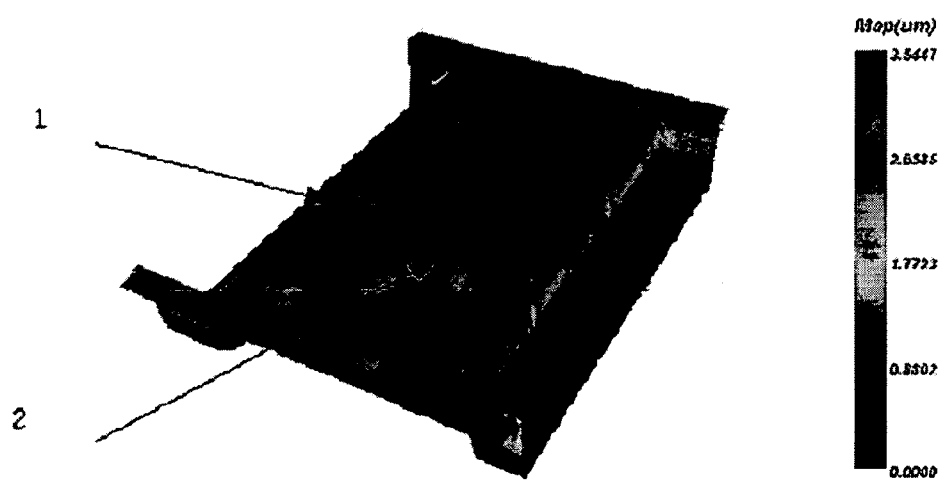

US 8,773,597 B2

PIXEL-TO-BARRIER-UNEVENESS-CONTROLLABLE INK

This application is a divisional application of U.S. application Ser. No. 11/375,534 filed Mar. 15, 2006 now U.S. Pat. No. 8,053,493 which claims the benefit of the filing date of Korean Patent Application No. 2005-21850, filed on Mar. 16, 2005, in the Korean Intellectual Property Office, the disclosure of which is incorporated herein in its entirety by reference.

TECHNICAL FIELD

The present invention relates to an ink, which can be used as ink-jet ink, dip coating ink, micropen ink, spray ink, or the like, and is controllable in terms of pixel-to-barrier unevenness.

BACKGROUND ART

Ink-jet technology includes simple processing steps and consumes a relatively small amount of raw materials. Thus, as a substitute for photolithography, ink-jet technology has been studied actively.

In general, ink that has been used for ink-jet technology comprises a pigment, a solvent, a binder polymer and an anti-drying agent.

However, when a solvent is used as a constitutional element of ink, there are problems in that occlusion of an ink-jet head nozzle may occur due to the drying of the solvent, and the ink volume decreases after drying, resulting in thinning of the film.

Additionally, there has been an attempt to use a binder polymer at a reduced content of at most about 3% in order to prevent the problem of an increase in the ink viscosity, occurring when a polymer is used as a binder. However, in this case, physical properties of the film are degraded due to an excessively large amount of pigment relative to such a small amount of polymer.

DISCLOSURE OF THE INVENTION

Therefore, the present invention has been made in view of the above-mentioned problems. It is an object of the present invention to provide an ink comprising low-viscosity monomers for forming a binder while reducing a used amount of a solvent.

It is another object of the present invention to provide an ink capable of avoiding formation of pixel-to-barrier unevenness during steps of filling ink into a patterned barrier and then curing ink to form a pattern, by controlling amount of the solvent so as to inhibit a decrease in the ink volume occurred due to the drying of the solvent used in the ink and by filling a gap formed by the barriers with ink in a convex shape so as to compensate for a volumetric shrinkage of the ink due to the drying of the solvent and/or due to the curing of the ink.

According to an aspect of the present invention, there is provided an ink, which has a viscosity and a volumetric shrinkage, controlled to 20~80 cP and 10~30%, respectively, by controlling an amount of each of: (a) a first monomer having a viscosity of 7~1,600 cP and having one or two polymerizable functional groups; and (b) a second monomer having a viscosity of 30~20,000 cP and having at least three polymerizable functional groups, in the presence of 0~20 wt % of a solvent, and which can form a convex portion due to its surface tension controlled to 20~40 mN/m, so as to compensate for its volumetric shrinkage, wherein the viscosity and the surface tension are measured at 25° C.

According to another aspect of the present invention, there is provided a substrate that is patterned or information-recorded with the ink as described above. A display device comprising the above substrate is also provided.

The ink according to the present invention may be used for filling a gap generated by patterned barriers on a substrate. Herein, the patterned barrier on the substrate may form a black matrix portion, and the ink that fills the gap generated among the barriers may form a color filter portion.

Hereinafter, the present invention will be explained in more detail.

As used herein, the term "polymerizable functional group" means a functional group capable of polymerization when initiating a polymerization reaction by light or heat. A typical example of such functional groups includes a carbon-carbon double bond. Also, a functional group capable of ring opening-polymerization, such as an epoxy group, may be used. Particular examples of the carbon-carbon double bond functional group include vinyl $CH_2=CH-$, vinylidene $CH_2=C<$, or the like.

The ink according to the present invention is characterized in that which comprises 0~20 wt % of a solvent;

which has a viscosity and a volumetric shrinkage, controlled to 20~80 cP and 10~30%, respectively, by controlling an amount of each of: (a) a first monomer having a viscosity of 7~1,600 cP and having one or two polymerizable functional groups; and (b) a second monomer having a viscosity of 30~20,000 cP and having at least three polymerizable functional groups; and which can form a convex portion due to its surface tension controlled to 20~40 mN/m, so as to compensate for its volumetric shrinkage.

The present inventors have studied factors affecting a volumetric shrinkage of ink in order to reduce unevenness between a barrier (e.g., black matrix) and ink that fills a gap generated among the barriers (e.g., pixel), such unevenness occurring when the gap formed by patterned barriers is filled with ink.

Volumetric shrinkage of ink is caused by removal of a solvent and shrinkage of ink during a curing step. Particularly, ink undergoes a volumetric shrinkage when the solvent used in the ink is dried and when an ink coating film is cured after the removal of the solvent.

To reduce volumetric shrinkage of ink, it is the most preferable to reduce the content of a solvent. According to the present invention, the solvent content is controlled to a level of 0~20 wt %, so as to reduce the volumetric shrinkage, caused by drying of the solvent, and to prevent occlusion of an ink-jet head nozzle, caused by drying of the solvent. Hence, it is possible to control the volumetric shrinkage, caused by drying of the solvent, to 5% or less, according to the present invention, although the volumetric shrinkage depends on the solvent content.

Meanwhile, the ink according to the present invention shows a reduced flowability, because it comprises a reduced amount of solvent. Thus, to compensate for such reduced flowability, the viscosity and the content of each monomer having a polymerizable functional group are controlled to obtain a low ink viscosity of 20~80 cP. When the ink shows a viscosity of 20~80 cP at 25° C., ink viscosity may reach 10~14 cP at an increased temperature of 40~80° C. upon jetting.

In general, a large molecular weight or presence of a polar functional group that increases intermolecular interaction results in an increase in the viscosity of a monomer. As the amount of a high-viscosity monomer increases, the resultant ink shows an increased viscosity.

According to the present invention, viscosity of ink can be controlled by adjusting the composition of monomers having a different viscosity. Particularly, the ink according to the present invention comprises a first monomer having one or two polymerizable functional groups and showing a viscosity of 7~1,600 cP, and a second monomer having at least three polymerizable functional groups and showing a viscosity of 30~20,000 cP.

Additionally, according to the present invention, it is possible to control the ink viscosity by controlling the addition amount and addition ratio of at least two multifunctional second monomers having a different viscosity, wherein the second monomer functions as a crosslinking agent.

According to one embodiment of the present invention, there is provided ink having a viscosity of 20~80 cP by using: (a) a first monomer having a viscosity of 10~15 cP and having two polymerizable functional groups; and (b) a multifunctional second monomer mixture comprising a low-viscosity monomer having a viscosity of 30~170 cP and a high-viscosity monomer having a viscosity of 10,000 cP or more.

Since the ink viscosity significantly increases even when adding a small amount of a polymer substance, it is not preferable to add a polymer substance that may increase the ink viscosity to ink.

Meanwhile, there is no direct correlation between viscosity and volumetric shrinkage.

However, the multifunctional second monomer used in the present invention can show a high viscosity due to multiple polar functional groups. Thus, when the content of the second monomer increases, ink viscosity may also increase. Meanwhile, if the content of the multifunctional second monomer is too high, crosslinking density increases after curing and thus hardness increase but shrinkage caused by curing tends to increase. Therefore, volumetric shrinkage tends to increase in proportion to viscosity.

Another factor affecting the volumetric shrinkage of ink is shrinkage caused by curing. When shrinkage caused by curing is reduced by decreasing the amount of the multifunctional second monomer that functions as a crosslinking agent, chemical resistance and hardness of ink may decrease. Hence, shrinkage caused by curing should be accepted to a certain degree in order to maintain coating film strength and chemical resistance.

Therefore, according to the present invention, shrinkage caused by curing is controlled to a level of 10~20% by adjusting the amount of the multifunctional second monomer. In order to reduce unevenness between patterned barriers and ink that fills a gap among barriers, while accepting the above level of shrinkage, the ink according to the present invention fills the barriers in a convex shape so as to provide convex portions to such a degree as to compensate for the volumetric shrinkage of ink, preferably to a degree corresponding to 90%~110% of the volumetric shrinkage of the ink, more preferably to a degree corresponding to the volumetric shrinkage of the ink.

Injection amount of ink into barriers may be controlled by controlling an ink-jet instrument. However, it is not possible to completely remove local unevenness generated upon drying and curing of the ink (e.g., pixel) that fills a gap among the barriers by simply controlling the injection amount of the ink into barriers.

The central portion of ink that fills a gap among the barriers may take a concave shape or a convex shape depending on the surface tension of the ink. According to the experiment performed by the present inventors, a high surface tension results in the formation of a convex central portion, while a low surface tension results in the formation of a concave central portion. To level the central portion, the ink should be loaded initially in a slightly convex shape. To compensate for the volumetric shrinkage of the ink to an adequate degree, the ink should have a suitable convex shape and surface tension of the ink is required to be controlled adequately. In order to accomplish this, the ink according to the present invention is controlled to have a surface tension of 20~40 mN/m at 25° C.

For example, if ink has a volumetric shrinkage of 10%, a preferred surface tension is about 32 mN/m. If ink has a volumetric shrinkage of 20%, a preferred surface tension is about 39 mN/m.

The content of a pigment depends on the color of ink, and thus the volumetric shrinkage and an adequate level of surface tension also depend on the color of ink.

Additionally, surface energy of a barrier portion depends on the content of an additive contained in the barrier (e.g., a fluorine-containing surfactant) and on application of surface treatment such as plasma treatment. Hence, it is required to adjust the surface tension depending on the surface characteristics of a barrier portion. In general, when a barrier portion has a low surface energy, the ink is controlled to have a low surface tension.

According to the present invention, it is preferable to control the volumetric shrinkage of the ink to a level of 10~30%, as measured before and after a curing step at 25° C., so as to reduce the unevenness between barriers and ink that fills a gap among the barriers. Such reduction of unevenness is accomplished by filling the barriers with ink in a convex shape to such a degree as to compensate for the volumetric shrinkage of the ink. Additionally, it is preferable to control the shrinkage caused by curing (excluding volumetric shrinkage caused by removal of a solvent), to 10~20%.

Meanwhile, surface tension of ink may be controlled independently from viscosity of the ink. For example, surface tension can be controlled by means of the kind and amount of a surfactant. When the amount of the surfactant increases, surface tension of the ink decreases. However, if the amount of the surfactant reaches a certain level (critical concentration), surface tension of the ink does not decrease any longer. Particularly, a surfactant having a large number of fluorine atoms in its molecule shows an excellent effect of reducing the surface tension. Such surfactants can further reduce the surface tension of ink even when added in an amount higher than the critical concentration.

The viscosity as described herein is based on the data measured at 25° C. by using a disk type Brookfield viscosimeter having a low-viscosity measuring unit attached thereto.

Additionally, the volumetric shrinkage as described herein is determined by forming an ink coating film on a glass substrate by way of a spin coating or ink-jet coating method; measuring the coating film thickness before and after the curing of the ink coating film by using a non-contact type laser measuring device or a probe type measuring device; and calculating the volumetric shrinkage (%) according to the following mathematical formula 1:

% Shrinkage=(thickness before curing−thickness after curing)/thickness before curing×100 [Mathematical Formula 1]

Meanwhile, the surface tension as described herein is based on the data obtained by measuring surface tension with a bubble pressure type Kruess surface tensiometer at 25° C. and calculating the surface tension value by way of extrapolation of surface tension values in an equilibrium state (there may be a measurement error of about 1~2 mN/m).

Hereinafter, constitutional elements forming the ink according to the present invention will be explained in detail.

(1) First Monomer Having One or Two Polymerizable Functional Groups

The first monomer has a low viscosity so as to control the viscosity of the ink. Therefore, it is possible to significantly reduce the amount of a solvent needed for the ink containing the first monomer.

The first monomer may be a single compound, or a mixture of first monomers having the same or different viscosity.

Particularly, the first monomer having a low viscosity permits the final ink to have a viscosity controlled to 80 cP or less, while reducing the solvent content. It is possible to control the ink viscosity to a level of 10~14 cP by heating at a suitable temperature, such viscosity being suitable for ink-jet ink.

The first monomer having a low viscosity preferably has a viscosity of 80 cP or less, more preferably of 10~15 cP at room temperature. If the first monomer has a viscosity higher than 80 cP, the resultant ink has an excessively high viscosity. In this case, it is difficult to reduce the ink viscosity to a level of 20 cP or less, which is suitable for jetting, even when the ink is heated to a heating temperature (100° C.) available from an ink-jet head.

Preferably, the first monomer having one or two polymerizable functional groups is a mono-acrylic or di-acrylic monomer, and particular examples thereof include: ethylene glycol (meth)acrylate, tetrahydrofurfuryl (meth)acrylate, ethyl (meth)acrylate, octyl (meth)acrylate, decyl (meth)acrylate, isooctyl (meth)acrylate, didecyl acrylate, lauryl (meth)acrylate, isobornyl (meth)acrylate, stearyl (meth)acrylate, isodecyl (meth)acrylate, tridecyl (meth)acrylate, phenol (meth)acrylate, nonyl phenol (meth)acrylate, glycidyl (meth)acrylate, bisphenol A (meth)acrylate, tripropylene glycol diacrylate, hexandiol di(meth)acrylate, cyclohexane dimethanol di(meth)acrylate, bisphenol A di(meth)acrylate, neopentyl glycol di(meth)acrylate, butanediol di(meth)acrylate, butylene glycol di(meth)acrylate, dipropylene glycol di(meth)acrylate, tripropylene glycol di(meth)acrylate, low-molecular weight polyethylene glycol di(meth)acrylate or polypropylene glycol di(meth)acrylate, etc., or alkoxy derivatives thereof.

The first monomer having one or two polymerizable functional groups is used in the ink preferably in an amount of 30 wt % or more, more preferably in an amount of 40~70 wt %. If the first monomer is used in an amount of less than 30 wt %, it is not possible to significantly reduce the amount of a solvent and to maintain the ink at an adequate viscosity.

(2) Second Monomer Having at Least Three Polymerizable Functional Groups

According to the present invention, the second monomer having at least three polymerizable functional groups serves as a crosslinking agent.

The second monomer may be a single compound, or a mixture of second monomers having the same or different viscosity.

Preferably, the second monomer is a multifunctional acrylate capable of crosslinking, and particular examples thereof include: ditrimethylol propane tetra(meth)acrylate, trimethylol propane tri(meth)acrylate, pentaerythritol tetra(meth)acrylate, dipentaerythritol penta(meth)acrylate, dipentaerythritol hexa(meth)acrylate, etc., or alkoxy derivatives thereof.

The second monomer having at least three polymerizable functional groups is used in the ink preferably in an amount of 3~50 wt %. If the second monomer is used in an amount of less than 3 wt %, hardness and chemical resistance of the resultant film are not sufficient. If the second monomer is used in an amount of greater than 50 wt %, cracking may occur on the film during a curing step.

Meanwhile, combination of the first monomer and the second monomer, which have a relatively small molecular weight and similar physical properties, for example, combination of acryl monomers or urethane monomers, increases the compatibility of the first monomer with the second monomer.

Preferably, each of the first monomer having one or two polymerizable functional groups and the second monomer having at least three polymerizable functional groups has a molecular weight of 190~1300.

Additionally, it is preferable to control the ratio of the first monomer to the second monomer that serves as a crosslinking agent to such a range as to maintain adequate hardness and chemical resistance of the coating film formed by the ink and a suitable ink viscosity.

Meanwhile, according to the prior art, it has been suggested to reduce the amount of a polymer binder so as to avoid a problem of an increase in the ink viscosity, caused by the high-viscosity polymer binder used as a constitutional element of the ink. As a result, there has been a problem in that the resultant film shows poor physical properties due to the pigment present in an excessively large amount relative to the content of the polymer binder. On the contrary, the ink according to the present invention uses a low-viscosity monomer, which forms a polymer binder after curing, in a large amount. Therefore, it is possible to increase the content of the polymer binder relative to the amount of a pigment after the application of the ink onto a substrate, and thus to improve physical properties of the resultant film.

Preferably, the coating film formed by the ink according to the present invention has a pencil hardness of 3H or higher.

(3) Solvent

The ink according to the present invention comprises a solvent in an amount of 0~20 wt %. If the solvent is used in an amount of greater than 20 wt %, it is not possible to obtain the effects of preventing a nozzle from being occluded by drying of the ink, and avoiding generation of ink-to-barrier unevenness, to a sufficient degree.

The solvent that may be used in the present invention may be any conventional solvent currently used in ink, and particular examples thereof include: water, acetone, methyl ethyl ketone, methyl isobutyl ketone, methyl cellosolve, ethyl cellosolve, tetrahydrofuran, 1,4-dioxane, ethylene glycol dimethyl ether, ethylene glycol diethyl ether, propylene glycol methyl ether, propylene glycol dimethyl ether, propylene glycol diethyl ether, chloroform, methylene chloride, 1,2-dichloroethane, 1,1,1-trichloroethane, 1,1,2-trichloroethane, 1,1,2-trichloroethene, hexane, heptane, octane, cyclohexane, benzene, toluene, xylene, methanol, ethanol, isopropanol, propanol, butanol, t-butanol, cyclohexanone, propylene glycol methyl ether acetate, propylene glycol ethyl ether acetate, 2-methoxybutyl acetate, ethyl 3-ethoxypropionate, ethyl cellosolve acetate, methyl cellosolve acetate, butyl acetate, methyl ethyl ketone, methyl isobutyl ketone, ethylene glycol monomethyl ether, γ-butyrolactone, N-methyl pyrrolidone, dimethyl formamide, tetramethylsulfone, ethylene glycol acetate, ethyl ether acetate, ethyl lactate, polyethylene glycol, cyclohexanone, or the like.

(4) Surfactant

The ink according to the present invention may further comprise a surfactant in order to control the surface tension of the ink.

The surfactant may be any surfactant currently used in the art. Particular examples of commercially available surfactants include silicone-based surfactant products available from BYK, Co., surfactant products available from Du Pont and Air Products, fluorine-containing surfactant products (FC series) available from 3M Co., fluorine-containing surfactant products (F series) available from Dai Nippon Ink and Chemical Co., or the like.

According to the present invention, it is possible to use at least two surfactants, which cause no coagulation with each other, in combination. The surfactant is used preferably in an amount of 5 wt % or less, more preferably in an amount of 1 wt % or less, based on the total weight of the ink. In general, it is preferable to use the surfactant in an amount of at most its critical amount.

(5) Others

The ink according to the present invention may further comprise a curing initiator, a curing accelerator or a coloring agent.

The curing initiator or the curing accelerator may be water soluble or may be dissolved by means of an emulsifier. Additionally, initiation of curing may be caused by light, heat or electron beams, but is not limited thereto.

The curing initiator may be selected from the group consisting of: biimidazole compounds, such as 2,2-bis(2-chlorophenyl)-4,4',5,5'-tetraphenyl biimidazole, 2,2'-bis(2,3-dichlorophenyl)-4,4',5,5'-tetraphenyl biimidazole, or the like; acetophenone compounds, such as 2-hydroxy-1-[4-(2-hydroxyethoxy)phenyl]-2-methyl-1-propane, 2-hydroxy-2-methyl-1-phenylpropane-1-one, 1-(4-isopropylphenyl)-2-hydroxy-2-methylpropane-1-one, 4-(2-hydroxyethoxy)-phenyl-(2-hydroxy)propyl ketone, 1-hydroxycyclohexyl phenyl ketone, benzoinmethyl ether, benzoinethyl ether, benzoinisobutyl ether, benzoinbutyl ether, 2,2-dimethoxy-2-phenylacetophenone, 2-methyl-(4-methylthiophenyl)-2-morpholino-1-propane-1-one, 2-benzyl-2-dimethylamino-1-(4-morpholinophenyl)-butane-1-one, or the like; benzophenone compounds, such as benzophenone, 4,4'-bis(dimethylamino) benzophenone, 4,4'-bis(diethylamino)benzophenone, 2,4,6-trimethylamino benzophenone, methyl-o-benzoyl benzoate, 3,3-dimethyl-4-methoxybenzophenone, 3,3',4,4'-tetra(t-butylperoxy carbonyl)benzophenone, or the like; fluorenon compounds, such as 9-fluorenone, 2-chloro-9-fluorenone, 2-methyl-9-fluorenone, or the like; thioxanthone compounds, such as thioxanthone, 2,4-diethylthioxanthone, 2-chlorothioxanthone, 1-chloro-4-propyloxythioxanthone, isopropyl thioxanthone, diisopropyl thioxanthone, or the like; xanthone compounds, such as xanthone, 2-methylxanthone, or the like; anthraquinone compounds, such as anthraquinone, 2-methylanthraquinone, 2-ethylanthraquinone, t-butylanthraquinone, 2,6-dichloro-9,10-anthraquinone, or the like; acridine compounds, such as 9-phenylacridine, 1,7-bis(9-acridinyl)heptane, 1,5-bis(9-acridinyl)pentane, 1,3-bis(9-acridinyl)propane, or the like; dicarbonyl compounds, such as benzyl, 1,7,7-trimethyl-bischloro[2,2,1]heptane-2,3-dione, 9,10-phenanthrenequinone, or the like; phosphine oxide compounds, such as 2,4,6-trimethylbenzoyl diphenylphosphine oxide, bis(2,6-dimethoxybenzoyl)-2,4,4-trimethylpentyl phosphine oxide, bis(2,6-dichlorobenzoyl)propyl phosphine oxide, or the like; amine-based synergists, such as methyl-4-(dimethylamino)benzoate, ethyl-4-(dimethylamino) benzoate, 2-n-butoxyethyl-4-(dimethylamino)benzoate, 2,5-bis(4-diethylaminobenzal)cyclopentanone, 2,6-bis(4-diethylaminobenzal)cyclohexanone, 2,6-bis(4-diethylamino benzal)-4-methyl-cyclohexanone, or the like; coumarine compounds, such as 3,3-carbonylvinyl-7-(diethylamino)coumarine, 3-(2-benzothiazolyl)-7-(diethyl amino) coumarine, 3-benzoyl-7-(diethylamino)coumarine, 3-benzoyl-7-methoxy-coumarine, 10,10'-carbonylbis[1,1,7,7-tetramethyl-2,3,6,7-tetrahydro-1H,5H,11H,CI]-benzopyrano[6,7,8-ij]-quinolizine-11-one, or the like; chalcone compounds, such as 4-diethylaminochalcone, 4-azidebenzalacetophenone, or the like; 2-benzoyl methylene, 3-methyl-β-naphtothiazoline iodide, and (4-methylphenyl)-[4-(2-methylpropyl)-phenyl[hexafluoro phosphine].

Additionally, particular examples of the curing accelerator that may be used in the present invention include: 2-mercapatobenzoimidazole, 2-mercaptobenzothiazole, 2-mercaptobenzooxazole, 2,5-dimercapto-1,3,4-thiadiazole, 2-mercapto-4,6-dimethylaminopyridine, pentaerythritol tetrakis(3-mercaptopropionate), pentaerythritol tris(3-mercaptopropionate), pentaerythritol tetrakis(2-mercaptoacetate), pentaerythritol tris(2-mercaptoacetate), trimethylolpropane tris(2-mercaptoacetate), trimethylolpropane tris(3-mercaptopropionate), trimethylolethane tris(2-mercaptoacetate), trimethylolethane tris(3-mercaptopropionate), or the like.

Preferably, the curing initiator or the curing accelerator is used in the ink in an amount of 0.1~10 wt %. If the amount is less than 0.1 wt %, ink cannot be cured sufficiently. If the amount is greater than 10 wt %, it is not possible to obtain a uniform coating layer due to the curing initiator or the curing accelerator.

The coloring agent that may be used in the present invention includes carbon black, dye or pigment, and particular examples thereof include organic compounds, such as azo-based compounds, phthalocyanine-based compounds, quinacridone-based compounds, dioxazine-based compounds, perylene-based compounds, perinone-based compounds, quinophthalone-based compounds, isoindolinone-based compounds, isoindoline-based compounds, dipyrrolo-pyrole-based compounds, etc., and complexes formed between the above compounds and metals. More particularly, it is possible to use C.I. pigment Red 254, C.I. pigment Red 48:1, C.I. pigment Red 122, C.I. pigment Red 188, C.I. pigment Red 57:1, C.I. pigment Yellow 97, C.I. pigment Yellow 12, C.I. pigment Yellow 180, C.I. pigment Yellow 139, C.I. pigment Yellow 150, C.I. pigment Yellow 139, C.I. pigment Yellow 12, C.I. pigment Green 7, C.I. pigment Green 36, C.I. pigment Blue 15:1, 15:3 or C.I. pigment Blue 15:6, C.I. pigment Violet 19, C.I. pigment Violet 23, or the like. However, the scope of the present invention is not limited to the above examples. It is also possible to use inorganic or organic materials, generally used in liquid crystal display devices, OLEDs and reflection type display devices (including e-books) as a color filter coloring agent.

The coloring agent may be used by mixing it simultaneously with other constitutional elements of the ink of the present invention. If desired, the coloring agent may be dispersed in the first monomer, before mixing it with other constitutional elements.

The coloring agent is used preferably in an amount of at most 50 wt %, more preferably in an amount of 3~20 wt %, based on the net weight of the pigment. If the coloring agent is used in an amount of less than 3 wt %, it is not possible to obtain a desired color. If the coloring agent is used in an amount of greater than 20 wt %, ink viscosity increases, and the resultant film shows insufficient hardness and chemical resistance.

If desired, to improve the quality of the ink, the ink according to the present invention may further comprise conventional additives for an ink composition, including a silicone-based adhesion promoter, a dispersing agent, a photosensitizer, a light stabilizer, a UV absorbing agent, a biological anti-fouling agent, an oxygen absorbing agent, or a thermal polymerization inhibitor, or the like. Herein, each additive is used in an amount of at most 5 parts by weight based on the weight of the ink.

There is no particular limitation in the method for preparing the ink according to the present invention. For example, constitutional elements forming the ink according to the present invention may be mixed by using a conventional mixing device, such as a ball mill, a sand mill, an atto lighter, a basket mill, a roll mill, or the like. Otherwise, the coloring agent is previously dispersed by using a conventional agitator before mixing it with other constitutional elements.

The ink according to the present invention may be introduced into an ink-jet instrument and then be ejected through a nozzle of the ink-jet instrument.

Although there is no particular limitation in the ink-jet instrument, an instrument comprising an ink-jet printer head using a piezoelectric element is preferred, so that the ink is ejected through a printer based on piezoelectric recording technique.

Additionally, the ink according to the present invention may be used as dip-coating ink, micropen ink, spray ink, or the like, besides ink-jet ink.

Meanwhile, the ink according to the present invention may be used for filling a gap generated among patterned barriers. Herein, the patterned barrier preferably has a hardness of 3H or more, as expressed in pencil hardness.

The ink according to the present invention may be used for forming color filters, such as a color filter of a liquid crystal device (LCD), a color filter of an organic light emitting device (OLED), or a color filter of a reflection type display device (including e-book).

The present invention also provides a substrate, which is patterned or information-recorded with the ink according to the present invention, and a display device having the substrate. In one embodiment, the ink according to the present invention may fill a gap generated among patterned barriers on the substrate. Herein, the patterned barrier on the substrate forms a black matrix portion, and the ink that fills the gap forms a color filter portion.

Particular examples of the display device include a liquid crystal display device, an OLED, or a reflection type display device.

BRIEF DESCRIPTION OF THE DRAWINGS

FIG. 1 is a view showing the three-dimensional shape of a pixel portion formed by using the ink according to Example 1, wherein drawing numeral 1 represents a black matrix barrier, and drawing numeral 2 represents a color filter pixel portion.

MODE FOR CARRYING OUT THE INVENTION

Reference will now be made in detail to the preferred embodiments of the present invention. It is to be understood that the following examples are illustrative only and the present invention is not limited thereto.

Example 1

First, 80 wt % of tripropylene glycol diacrylate (viscosity: 15 cP) was dispersed with 5 wt % of BYK168 as a dispersing agent and 15 wt % of P.I. Red 254 as a coloring agent to form dispersion. To 33 wt % of the dispersion, 35 wt % of 1,6-hexanediol diacrylate (viscosity 9 cP) and 2 wt % of tripropylene glycol diacrylate (viscosity 15 cP) were added. Then, 15 wt % of trimethylolpropane triacrylate (viscosity 106 cP) and 9 wt % of dipentaerythritol hexaacrylate (viscosity 10000 cP or more) as crosslinking agents and 5 wt % of Irgacure369 (Ciba Geigy) as a photoinitiator were further added thereto. Finally, other additives, including KBM (a silicon-containing surfactant available from Shinetsu, Japan) and FC (a fluorine-containing surfactant available from DIC, Japan) were added thereto, each in an amount of less than 1 wt % to provide ink.

After filtering the ink through a filter having a pore size of 1 μm, the ink had a surface tension of 35 mN/m and a viscosity of 29 cP.

The ink was coated onto a glass via spin coating to form a film, and cured by UV irradiation, and heat treated on a hot plate at 150° C. for 20 minutes. The resultant film had a pencil hardness of 4H or more, and showed a low color change corresponding to a $\Delta E_{ab}$ value of 3 or less, even after dipping the film into N-methyl pyrrolidinone for 1 hour.

Additionally, the ink was subjected to a jetting test by using a Jetlab ink-jet printer (Microfab, USA). Here, the ink-jet head was maintained at 50° C. in order to facilitate jetting of ink. After the test, it was shown that the ink according to this example was barely dried in the head, so that ink jetting was smoothly carried out with no occlusion of the nozzle even when the ink was ejected through the head after the head was not subjected to ink jetting but was left in the air for 10 minutes or more.

Further, the ink was jetted into a black matrix pattern (obtained by way of photolithography) having a height of 3 μm and a size of 100 μm×300 μm in an amount of about 100~120 pL so that the ink fills the pattern in a convex shape to provide a color filter pattern. Then, the color filter pattern was cured by UV irradiation and was treated on a hot plate at 150° C. for 20 minutes. After the treatment, the color layer had a thickness of 2 μm or more, and showed a level difference (unevenness) of 0.2 μm or less from the black matrix pattern.

When the amount of the surfactant was controlled to adjust the surface tension of the ink, it was possible to reduce the unevenness between the black matrix and the color filter. In other words, when the surface tension was reduced to a level of 22 mN/m, the ink filled the black matrix pattern in a concave shape, and the thickness of color pixel area formed from ink material was 1 μm or more after curing. On the other hand, when the surface tension was increased to about 42 mN/m, the ink was filled into the black matrix pattern in a convex shape, and the central portion of the ink also had a convex shape after curing, so that the central portion was higher than the black matrix. However, when the surface tension was adjusted to a suitable level (34 mN/m), the ink was filled in a slightly convex shape and the ink volume decreased after curing, so as to level the central portion of the ink and the black matrix to provide a pixel-to-barrier unevenness of 0.2 μm or less.

Example 2

First, 80 wt % of tripropylene glycol diacrylate (viscosity: 15 cP) was dispersed with 5 wt % of BYK168 as a dispersing agent and 15 wt % of P.I. Green 36 as a coloring agent to form dispersion. To 45 wt % of the dispersion, tripropylene glycol diacrylate (viscosity 15 cP) was added to an amount of 70 wt % of the weight of the ink. Then, 5 wt % of trimethylolpropane triacrylate (viscosity 106 cP) and 4 wt % of dipentaerythritol hexaacrylate (viscosity 10000 cP or more) as crosslinking agents and 5 wt % of Irgacure369 (Ciba Geigy) as a photoinitiator were further added thereto. Finally, other additives, including a silicon-containing surfactant and a fluorine-containing surfactant were added thereto, each in an amount of less than 1 wt % to provide ink.

After filtering the ink through a filter having a pore size of 1 μm, the ink had a surface tension of 37 mN/m.

pixel portion and a barrier portion (unevenness) generated by the inks.

TABLE 1

|   | First Monomer (viscosity, amount) | Second Monomer (viscosity, amount) | Solvent (amount) | Other additives (amount) | Ink viscosity (room temp.) | Ink volumetric shrinkage | Ink surface tension | Unevenness (level difference from barrier) |
|---|---|---|---|---|---|---|---|---|
| Ex. 1 | Tripropylene glycol diacrylate (15 cP, 28.4 wt %) 1,6-hexanediol diacrylate (9 cP 35 wt %) | Trimethylol propane triacrylate (106 cP, 15 wt %) Dipentaerythritol hexaacrylate (10,000 cP or more, 9 wt %) | | Irgacure369 (5 wt %) surfactant (<2 wt %) | 29 cP | ~20% | 35 mN/m | 0.2 μm |
| Ex. 2 | Tripropylene glycol diacrylate (15 cP, 70 wt %) | Trimethylol propane triacrylate (106 cP, 9 wt %) Dipentaerythritol hexaacrylate (10,000 cP or more, 4 wt %) | | Irgacure369 (5 wt %) surfactant (<2 wt %) | 48 cP | ~15% | 37 mN/m | 0.3 μm |
| COMP. EX. 1 | | | Propylene glycol methylether acetate (69 wt %), glycerol (10 wt %) | Binder resin (10 wt %) Irgacure369 (5 wt %) surfactant (<2 wt %) | 10 cP | 70% or more | Not Treasured | 2 μm or more |

The ink was coated onto a glass via spin coating to form a film, and cured by UV irradiation, and heat treated on a hot plate at 150° C. for 20 minutes. The resultant film had a pencil hardness of 4H or more, and showed a low color change corresponding to a $\Delta E_{ab}$ value of 3 or less, even after dipping the film into N-methyl pyrrolidinone for 1 hour.

The ink was subjected to jetting in a similar manner to Example 1. After curing, the ink pixel portion was observed and it was shown that the pixel-to-barrier unevenness was reduced to 0.3 μm or less.

Comparative Example 1

To a color photoresist liquid (available from LG Chem., Co., Ltd.) used in the manufacture of a color filter of a liquid crystal display device, 10 wt % of glycerol was added as an anti-drying agent, and then a jetting test was performed. The ink was comprised of 4 wt % of a pigment, 1.2 wt % of a dispersing agent, 10 wt % of a binder resin, and 5 wt % of Irgacure (Ciba-Geigy). Other additives, including a silicon-containing surfactant and a fluorine-containing surfactant, were added thereto, each in an amount of 1 wt % or less. The ink was further comprised of 60 wt % or more of propylene glycol ethyl ether acetate as a solvent.

When the ink was subjected to jetting, there was a serious nozzle drying phenomenon. Hence, it was necessary to clean the nozzle after the nozzle head was not operated for about 10 seconds for the subsequent jetting work. Therefore, the ink showed poor workability, because a cleaning step was required after correcting the position of a substrate. Additionally, after the resultant pattern was dried and cured, it was shown that the ink pixel experienced an excessive shrinkage in its volume, as demonstrated by a significant level difference (2 μm or more) between the black matrix and the color layer.

The following Table 1 shows the composition and physical properties of the inks according to Examples 1 and 2 and Comparative Example 1, and the level difference between a

INDUSTRIAL APPLICABILITY

As can be seen from the foregoing, the ink according to the present invention can prevent an ink-jet head nozzle from being occluded by drying of a solvent. When the ink is used to form a pattern by jetting it into a black matrix barrier and then cured to form a color filter, it shows a low volumetric shrinkage, caused by the evaporation of the solvent. Therefore, it is possible to avoid unevenness between the color filter portion and the black matrix portion, so as to avoid a need for a separate over-coating step for leveling before carrying out the following steps.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:
1. A display device comprising:
   a substrate,
   wherein the display device is a liquid crystal display device, organic light emitting device (OLED), or reflection display device,
   wherein the substrate is patterned or information-recorded with an ink,
   wherein the ink fills a gap generated among patterned barriers formed on the substrate,
   wherein the ink has a viscosity and a volumetric shrinkage, controlled to 20~80 cP and 10~30%, respectively, by controlling an amount of each of: (a) a first monomer having a viscosity of 10 to 15 cP and having one or two polymerizable functional groups; and (b) a second monomer mixture, which is an acrylic monomer mixture comprising a low-viscosity monomer having a viscosity of 30 to 170 cP and a high-viscosity monomer having a viscosity of 10,000 cP or greater,
   wherein the second monomer mixture has a viscosity of 30 to 20,000 cP, and each of the monomer comprised in the mixture has at least three polymerizable functional groups, in the presence of 0 to 20 wt % of a solvent, wherein the ink can form a convex portion due to its surface tension controlled to 20 to 40 mN/m on a glass substrate, so as to compensate for its volumetric shrinkage, wherein the viscosity and the surface tension are measured at 25° C., and wherein the high-viscosity monomer is included in an amount of 4 to 9 wt % based on the ink.

2. The display device according to claim 1, wherein the patterned barrier has a pencil hardness of 3H or greater.

3. The display device according to claim 1, wherein the patterned barrier formed on the substrate forms a black matrix portion and the ink that fills a gap generated among the barriers forms a color filter portion.

* * * * *